US009402266B2

(12) United States Patent
Choi et al.

(10) Patent No.: US 9,402,266 B2
(45) Date of Patent: Jul. 26, 2016

(54) PRIORITY-BASED DATA TRANSMISSION METHOD IN A PEER-TO-PEER COMMUNICATION SYSTEM

(75) Inventors: Jinsoo Choi, Anyang-si (KR); Hangyu Cho, Anyang-si (KR); Jiwoong Jang, Anyang-si (KR); Dongcheol Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 14/131,386

(22) PCT Filed: Jul. 11, 2012

(86) PCT No.: PCT/KR2012/005494
§ 371 (c)(1),
(2), (4) Date: Jan. 7, 2014

(87) PCT Pub. No.: WO2013/009090
PCT Pub. Date: Jan. 17, 2013

(65) Prior Publication Data
US 2014/0140296 A1 May 22, 2014

Related U.S. Application Data

(60) Provisional application No. 61/506,649, filed on Jul. 12, 2011, provisional application No. 61/507,126, filed on Jul. 13, 2011.

(51) Int. Cl.
| | | |
|---|---|---|
| H04L 1/18 | (2006.01) | |
| H04W 72/12 | (2009.01) | |
| H04J 11/00 | (2006.01) | |
| H04L 5/00 | (2006.01) | |
| H04W 88/06 | (2009.01) | |

(52) U.S. Cl.
CPC ....... *H04W 72/1247* (2013.01); *H04J 11/0036* (2013.01); *H04L 1/1887* (2013.01); *H04L 5/0055* (2013.01); *H04L 5/0007* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2006/0072530 A1* | 4/2006 | Strutt et al. | 370/338 |
| 2009/0016229 A1* | 1/2009 | Wu et al. | 370/252 |
| 2009/0016295 A1* | 1/2009 | Li | H04L 5/0007 370/330 |
| 2009/0111506 A1 | 4/2009 | Laroia et al. | |

FOREIGN PATENT DOCUMENTS

| | | |
|---|---|---|
| JP | 2010-278693 | 12/2010 |
| KR | 10-2003-0064896 | 8/2003 |
| KR | 10-2010-0017470 | 2/2010 |

OTHER PUBLICATIONS

PCT International Application No. PCT/KR2012/005494, Written Opinion of the International Searching Authority dated Dec. 10, 2012, 17 pages.

* cited by examiner

*Primary Examiner* — Michael Thier
*Assistant Examiner* — Yaotang Wang
(74) *Attorney, Agent, or Firm* — Lee, Hong, Degerman, Kang & Walmey; Jonathan Kang; Michael Monaco

(57) ABSTRACT

The present invention relates to a wireless access system, and more particularly, to methods for transceiving data in a peer-to-peer (P2P) communication system, and to apparatuses for supporting the methods. According to one embodiment of the present invention, a method for transmitting data from a first device, which is a peer device in a P2P communication system, comprises the steps of: receiving an acknowledgement signal broadcast from a second device; comparing the priority of a P2P communication link of the second device and the priority of a P2P communication link of the first device on the basis of a resource region in which the acknowledgement signal is broadcast; and determining, by the first device on the basis of the first priority, whether or not to transmit the data or make a concession to data transmission.

14 Claims, 8 Drawing Sheets

PRIORITY-BASED DATA TRANSMISSION METHOD IN A PEER-TO-PEER COMMUNICATION SYSTEM

CROSS-REFERENCE TO RELATED APPLICATIONS

This application is the National Stage filing under 35 U.S.C. 371 of International Application No. PCT/KR2012/005494, filed on Jul. 11, 2012, which claims the benefit of U.S. Provisional Application Ser. No. 61/506,649, filed on Jul. 12, 2011, and 61/507,126, filed on Jul. 13, 2011, the contents of which are all hereby incorporated by reference herein in their entirety.

FIELD OF THE INVENTION

The present invention relates to a wireless access system and, more particularly, to methods for transceiving (transmitting and receiving) data in a peer to peer communication system.

BACKGROUND ART

Hereinafter, a communication environment of communication between devices according to the present invention will be briefly described.

P2P (Peer to Peer) communication literally refers to a communication between an electronic device and another electronic device. As a broader definition, P2P refers to a wireless or wired communication between electronic devices, or to a communication between a user-controlled device and a machine. However, recently, P2P has generally been defined as a wireless communication between an electronic device and another electronic device, which is performed without any human involvement.

When the concept of P2P communication was first adopted in the early 1990's, P2P communication was merely understood and recognized as the concept of remotely controlled communication or telematics, and the related market was also limited to such concept. However, over the past few years, P2P communication has been under development at a remarkable rate and has now evolved to a market drawing global attention. Most particularly, the P2P communication has greatly influenced diverse fields including Fleet Management, remote monitoring of devices and equipments, smart meter for measuring the operation time of a construction equipment installation and for automatically measuring the usage amount of heat or electricity in an applied market related to the Point of Sales (POS) and security. The P2P communication that is to be used in the future is expected to be used and applied for a wider scope of usage in association with the conventional mobile communication and high speed wireless internet or low power communication solutions, such as Wi-Fi and Zigbee, thereby becoming the basis for expanding its market domain to the B2C (Business to Consumer) market, and not being limited only to the B2B (Business to Business) market.

Hereinafter, the above-described term P2P may be used as an alternative term for D2D (Device to Device), M2M (Machine to Machine), and so on.

DETAILED DESCRIPTION OF THE INVENTION

Technical Objects

In the P2P communication, wherein Centralized scheduling is absent, data transmission is realized in accordance with a frame structure based upon specific time slots. However, unlike the conventional general cellular system, wherein a base station conventionally determines the presence or absence of ACK/NACK and directs re-transmission respective to the determined result, there lies a problem in that, with the absence of a central controller that is intended to control re-transmission, scheduling of the re-transmission becomes difficult.

If a specific transmitting device arbitrarily performs re-transmission in accordance with a negative acknowledgement signal (NACK signal), which is transmitted by a specific receiver, this may influence (or affect) data transmission of other peer devices. Most particularly, if the corresponding re-transmission influences a P2P communication link having a higher priority level than that of the current P2P communication link, the problem may become more critical. Therefore, a solution for resolving such problem is being required.

The present invention is devised to resolve the above-described general technical problems of the related art. Accordingly, an object of the present invention is to support efficient P2P communication.

Another object of the present invention is to provide methods for enabling each of the peer devices to decide whether to transmit or yield data based upon the respective priority levels, by transmitting and receiving acknowledgement signals based upon priority levels.

Yet another object of the present invention is to provide methods for enabling peer devices to decide whether to transmit or yield data based upon priority levels and data interference.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Technical Solutions

In order to resolve the above-described technical problems, the present invention provides methods for transceiving (transmitting and receiving) data in a peer to peer communication system and devices for supporting the same.

According to an aspect of the present invention, in a method for transmitting data from a first device corresponding to a Peer Device, in a Peer to Peer (P2P) communication system, the method includes the steps of updating a device list respective to neighboring peer devices through a peer discovery process in the first device, deciding priority level of links between the peer devices through a connection identifier set up process and a transmission request/response process, and deciding a resource area of the acknowledgement signal in accordance with the decided priority level.

Additionally, the method may further include the steps of receiving a broadcasted acknowledgement signal from a second device, comparing priority levels between a P2P communication link of the second device and a P2P communication link of the first device, based upon a resource area to which the acknowledgement signal is broadcasted, and determining whether to transmit data or whether to yield data transmission based upon the priority level.

Additionally, the method may further include the step of deciding a re-transmission resource area for re-transmitting data based upon the priority level and a number of links between the peer devices in the first device.

When the acknowledgement signal corresponds to a negative acknowledgement signal (NACK), and when the priority level of the P2P communication link of the second device is higher than the priority level of the P2P communication link of the first device, the first device may yield transmission of the data and may an idle mode.

When the acknowledgement signal corresponds to a negative acknowledgement signal (NACK), and when the priority level of the P2P communication link of the second device is lower than the priority level of the P2P communication link of the first device, the first device may perform transmission of the data.

Additionally, the first device may measure an interference level respective to the acknowledgement signal, and, even if the priority level of the P2P communication link of the second device is higher than the priority level of the P2P communication link of the first device, if the interference level is lower than a predetermined threshold value, the first device may perform data transmission.

Additionally, the first device may measure an interference level during at least any one of the connection identifier set up process and the transmission request/response process, and, even if the priority level of the P2P communication link of the second device is higher than the priority level of the P2P communication link of the first device, if the interference level is lower than a predetermined threshold value, the first device may perform data transmission.

In another aspect of the present invention, a first device transmitting data in a Peer to Peer (P2P) communication system includes a transmitter, a receiver, and a processor configured to control the data transmission.

At this point, the receiver may receive an acknowledgement signal broadcasted from a second device, and the processor may compare priority levels between a P2P communication link of the second device and a P2P communication link of the first device, based upon a resource area to which the acknowledgement signal is broadcasted. Thereafter, the processor may determine whether to transmit data or whether to yield data transmission based upon the priority level.

Additionally, the processor may update a device list respective to neighboring peer devices through a peer discovery process in the first device, may decide priority level of links between the peer devices through a connection identifier set up process and a transmission request/response process, and may decide a resource area of the acknowledgement signal in accordance with the decided priority level.

Herein, the processor may decide a re-transmission resource area for re-transmitting data based upon the priority level and a number of links between the peer devices.

When the acknowledgement signal corresponds to a negative acknowledgement signal (NACK), and when the priority level of the P2P communication link of the second device is higher than the priority level of the P2P communication link of the first device, the first device may yield transmission of the data and may enter an idle mode.

When the acknowledgement signal corresponds to a negative acknowledgement signal (NACK), and when the priority level of the P2P communication link of the second device is lower than the priority level of the P2P communication link of the first device, the first device may perform transmission of the data.

The processor may measure an interference level respective to the acknowledgement signal. And, at this point, even if the priority level of the P2P communication link of the second device is higher than the priority level of the P2P communication link of the first device, if the interference level is lower than a predetermined threshold value, the first device may perform data transmission by using the transmitter.

The processor may measure an interference level during at least any one of the connection identifier set up process and the transmission request/response process. And, at this point, even if the priority level of the P2P communication link of the second device is higher than the priority level of the P2P communication link of the first device, if the interference level is lower than a predetermined threshold value, the first device may perform data transmission.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

Advantageous Effects

The exemplary embodiment of the present invention have the following advantages.

First of all, peer devices of a P2P network may efficiently perform P2P communication.

Secondly, by deciding whether to transmit or yield data based upon priority levels of acknowledgement signals broadcasted by each peer device, overhead and power consumption caused by data transception may be reduced as compared to the conventional data method, wherein connection scheduling is required to be performed at each traffic slot.

For example, without having to perform the process of receiving a NACK signal, and then performing a connection scheduling process in a next traffic slot, the peer devices of the P2P communication link having decided to yield data transmission, the corresponding peer devices may directly enter the power saving mode.

Thirdly, the present invention is advantageous in that even the transmitting peer devices performing re-transmission may omit the connection scheduling process step in the next traffic slot, so as to reserve resources for performing re-transmission. Most particularly, when a large number of P2P communication links having a large amount of data that are to be transmitted or having to continuously transmit data in real-time, the gain proposed in the present invention may be more largely increased.

Finally, by having the peer devices decide whether to transmit or yield data based upon the priority level and the interference of data, data may be more efficiently transmitted.

The effects that may be gained from the embodiment of the present invention will not be limited only to the effects described above. Accordingly, additional effects of the present application will be set forth in part in the description which follows and in part will become apparent to those having ordinary skill in the art upon examination of the following or may be learned from practice of the present application. More specifically, unintended effects obtained upon the practice of the present invention may also be derived by anyone having ordinary skill in the art.

BRIEF DESCRIPTION OF THE DRAWINGS

The accompanying drawings are provided to facilitate the understanding of the present invention. A more detailed understanding of the present invention may be gained from the following detailed description of the present invention, which will be made based upon examples with reference to the accompanying drawings. However, the technical characteristics of the present invention will not be limited only to a specific drawing. And, it should be understood that the characteristics disclosed in the accompanying drawings may be differently combined so as to configure a new exemplary embodiment of the present invention.

MODE FOR CARRYING OUT THE PRESENT INVENTION

Figure 1:
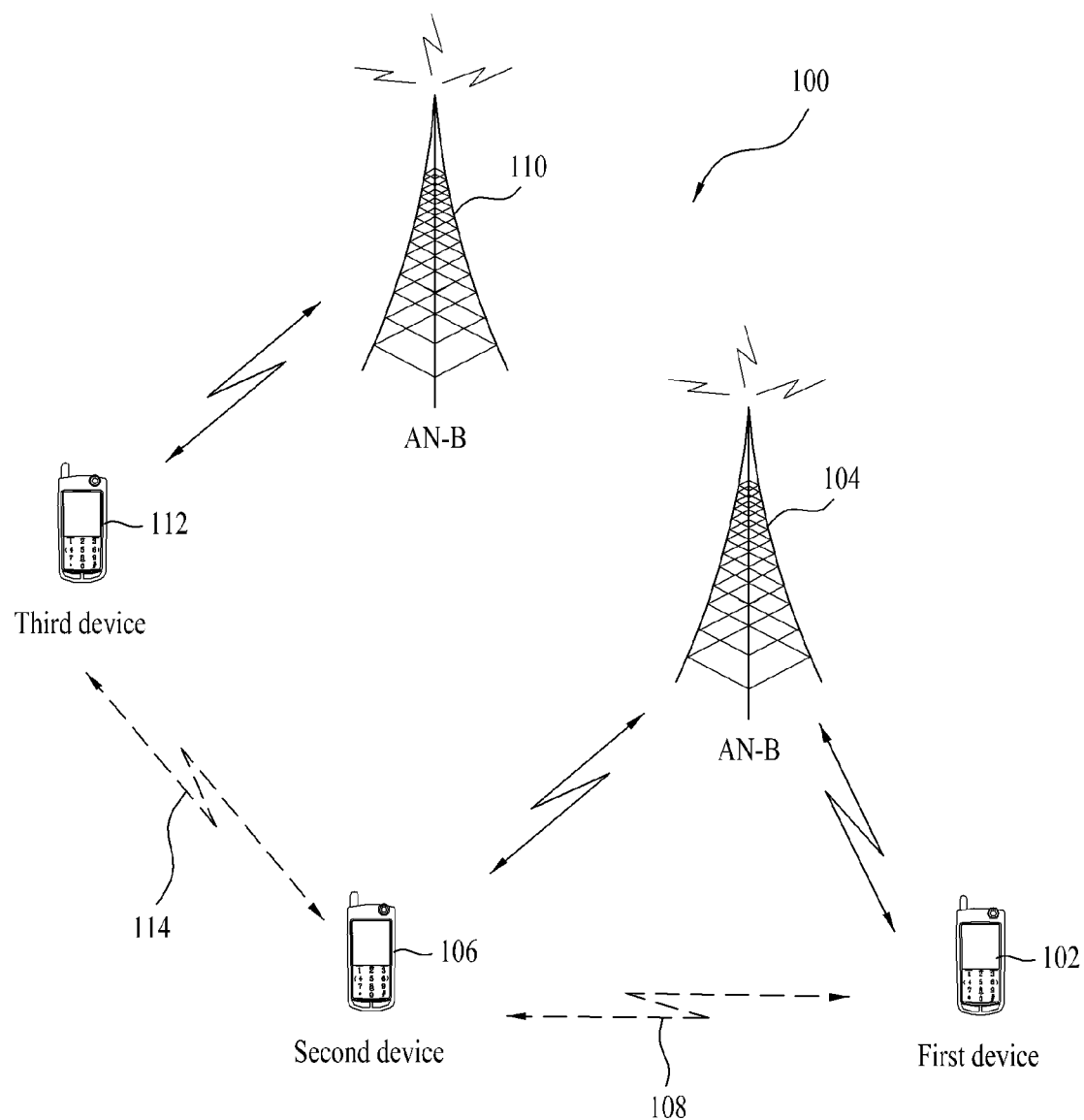
FIG. 1 illustrates an example of a P2P network being used in an Ad-hoc communication system with respect to a wideband network.

The exemplary embodiments of the present invention respectively relate to methods for transceiving (transmitting and receiving) data in a peer to peer communication system, which corresponds to a wireless access system supporting a Peer-to-Peer (P2P) environment and devices for supporting the same.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the description of the present invention, the embodiments of the present invention will be described by mainly focusing on the data transmission and reception relation between peer devices. However, in addition to the data transmission and reception between the peer devices, the exemplary embodiments of the present invention may also be applied to data transmission and reception relation between a peer device and a base station (e.g., Access Node).

Herein, the base station may refer to a terminal node of the network that performs direct communication with the mobile station. Occasionally, in the description of the present invention, particular operations of the present invention that are described as being performed by the base station may also be performed by an upper node of the base station.

More specifically, in a network consisting of multiple network nodes including the base station, diverse operations that are performed in order to communicate with the terminal may be performed by the base station or network nodes other than the base station. Herein, the term 'Base Station (BS)' may be replaced by other terms, such as fixed station, Node B, eNode B (eNB), ABS (Advanced Base Station), AN (Access Node) or Access Point (AP).

Additionally, the term Peer Device may be replaced by terms including MS (Mobile Station), UE (User Equipment), SS (Subscriber Station), MSS (Mobile Subscriber Station), Mobile Terminal, AMS (Advanced Mobile Station) or Terminal. Most particularly, in the description of the present invention, the peer device may be used to have the same meaning as an M2M (Machine to Machine) device.

Additionally, the transmitting end refers to a fixed and/or mobile node providing data services or audio services (or voice services), and the receiving end refers to a fixed and/or mobile node receiving data services or audio services (or voice services). Therefore, in an uplink, the mobile station may become the transmitting end, and the base station may become the receiving end. And, similarly, in a downlink, the mobile station may become the receiving end, and the base station may become the transmitting end.

The exemplary embodiments of the present invention may be supported by the standard documents that are disclosed in at least any one of the diverse wireless access systems, such as an IEEE 802.xx system, a 3GPP system, a 3GPP LTE system, and a 3GPP2 system. More specifically, among the exemplary embodiments of the present invention, reference may be made to the above-mentioned documents for the description of obvious process steps or elements of the present invention that have not been described herein.

Furthermore, all of the terms mentioned in the description of the present invention may be described and defined with reference to the standard documents. Most particularly, the exemplary embodiments of the present invention may be supported by at least one or more of the P802.16e-2004, P802.16e-2005, P802.16m, P802.16p, and P802.16.1b standard documents, which correspond to the standard documents for the IEEE 802.16 system.

Hereinafter, the preferred embodiments of the present invention will be described in detail with reference to the accompanying drawings. The detailed description of the present invention that is disclosed as follows with reference to the accompanying drawings is merely the description of exemplary embodiments of the present invention. And, therefore, the description of the present invention does not seek to represent a unique embodiment of the present invention.

Reference will now be made in detail to the preferred embodiments of the present invention, examples of which are illustrated in the accompanying drawings, so that anyone skilled in the art can easily implement the embodiments of the present invention. However, it will be apparent that the present invention may be implemented in a variety of different structures, and, therefore, the present invention will not be limited only to the exemplary embodiments presented herein. Furthermore, in the accompanying drawings, in order to clearly describe the embodiments of the present invention, any parts irrelevant to the description of the present invention will be omitted. And, wherever possible, similar reference numbers will be used throughout the drawings to refer to the same or like parts.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", " . . . module", and so on, which are indicated in the description of the present invention, indicates units that process at least one function or operation. And, this may be realized in the form of hardware or software, or a combination of hardware and software.

The specific terms used in the following embodiments of the present invention are provided to facilitate the understanding of the present invention. And, therefore, without deviating from the technical scope and spirit of the present invention, such specific terms may also be varied and/or replaced by other terms.

1. General Peer to Peer System

The exemplary embodiments of the present invention relate to data channel structures and control channel structures supporting Peer to Peer (P2P) signaling respective to one-one transmission, one-to-many transmission, and many-to-one transmission throughout a frequency spectrum. A time-frequency structure within a channel is used by a transmitting device and receiving device pair in order to signal requests and responses, so that traffic can be transmitted over a specific traffic time slot.

The time-frequency structure is defines by multiple tones and symbols. And, a subset of tones within symbols (e.g., Orthogonal Frequency Division Multiplexing (OFDM) symbols) may be used for identifying a specific P2P connection. A protocol may be defined in order to additionally support one-to-many and many-to-one transmission within a P2P network. In accordance with the defined protocol, a specific device may use a neighboring set of tones and symbols within the time-frequency structure, so as to identify P2P connections to multiple peer devices.

The tone-symbols respective to one-to-many connections may be allocated to peer devices through a paging channel, and selected neighboring tone-symbols may be implicitly notified within a protocol of the P2P network by implication.

1.1 Ad-Hoc Communication System

An Ad-hoc communication system may include a P2P wireless (or radio) network. In the exemplary embodiments of the present invention, the P2P wireless network may be established between two peer devices without any intervention of a central network controller. For example, the P2P wireless network may operate within a frequency spectrum, which is shared among multiple wireless devices.

FIG. 1 illustrates an example of a P2P network being used in an Ad-hoc communication system with respect to a wideband network.

A P2P network and a wideband network may share the same frequency. Additionally, the P2P network may operate in a difference frequency spectrum, e.g., in a spectrum specified for the usage of a P2P network. A communication system (100) may include one or more wireless (or radio) devices (e.g., a first device (102), a second device (106), and a third device (112)). In FIG. 1, although it is shown that the communication system (100) includes only three wireless devices, the communication system (100) may include more than three wireless devices or less than three wireless devices.

In the exemplary embodiments of the present invention, the wireless devices respectively correspond to P2P devices, which are used in a P2P system/P2P communication. In FIG. 1, each of the first device (102), the second device (106), and the third device (112) may correspond to any one of cellular phones, smart phones, laptop computers, compact communication devices, compact calculation devices, satellite radios, global positioning systems, PDAs, and/or any other arbitrary devices adequate for performing communication through the wireless communication system (100).

A P2P communication system (100) may support a wideband network (or WAN: Wide Area Network), and the Wide Area Network may include one or more wireless devices (e.g., a first device (102), a second device (106), and a third device (112)) within one or more sectors/cells/sections (or areas), an arbitrary (or random) number of heterogeneous access nodes (not shown) receiving, transmitting, and iterating (or repeating) wireless communication signals to and/or from one another, and one or more Access Nodes (AN), such as AN-A (104) and AN-B (110). In the present invention, the AN may also be referred to as a base station (BS) or an access point (AP).

Each of the access nodes AN-A (104) and AN-B (110) may include multiple transmitter chains and receiver chains, and each of the multiple transmitter chains and receiver chains may include multiple components related to the transmission and reception of radio signals (e.g., processors, modulators, multiplexers, demodulators, demultiplexers, antennae, and so on). When performing communication through a wide area (or wide band) infra-structure network, which is supported by the communication system (100), the radio devices may receive signals from the AN, or the radio devices may transmit radio signals to the AN. For example, in case the first device (102) and the second device (106) performs communication with the network through AN-A (104), the third device (112) may perform communication with the network through AN-B (110).

Moreover, the wireless devices may also directly perform communication with one another through a P2P network (e.g., Ad-hoc network) in a local area without any controller, such as the AN. And, the P2P communication may be performed by directly transceiving (transmitting and receiving) signals between the wireless devices. Accordingly, such signals are not required to be traversed through an access node (e.g., base station) or a centrally managed (or controlled) network. The P2P network may provide short ranged fast data rate communication (e.g., household, office, etc, type settings). For example, the first device (102) and the second device (106) may configure a first P2P network (108), and the second device (106) and the third device (112) may configure a second P2P network (114). At this point, the P2P network may be used to have the same meaning as P2P link or P2P connection.

The links of each of the P2P networks (108 and 114) may be established between wireless devices within an advantageous geographical area (e.g., within the area respective to each network). However, the wireless devices are not required to be related to the same sector and/or cell that is to be included in the P2P network. Moreover, the P2P networks may either overlap one another, or the P2P networks may configure a single P2P network in an area being included in another larger P2P network.

Additionally, the P2P communication between the wireless devices may be synchronized. For example, in order to synchronize the first device and the second device, a common clock reference (or criterion) may be used. The first device (102) and the second device (106) may acquire timing signals from the AN-A (104). Alternatively, the first device (102) and the second device (106) may also acquire timing signals from other sources (e.g., GPS satellites or television broadcasting stations).

1.2 Frame Structure

Hereinafter, a frame structure that is used in the exemplary embodiments of the present invention will be described in detail.

Figure 2:
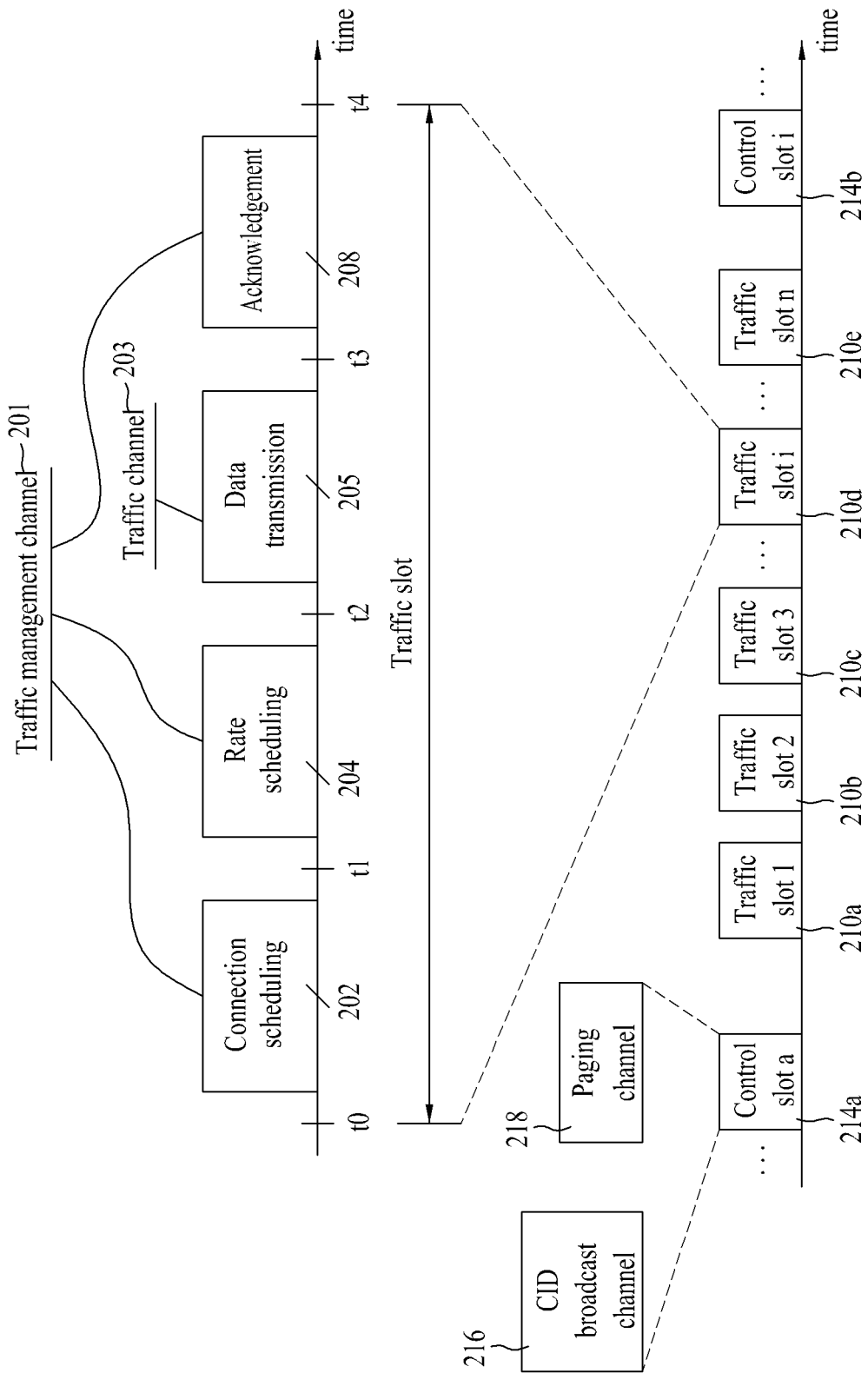
FIG. 2 illustrates an exemplary timing sequence respective to a traffic channel slot that can be used by wireless devices for delivering traffic after a P2P communication connection is established between the wireless devices.

FIG. 2 illustrates an exemplary timing sequence respective to a traffic channel slot that can be used by wireless devices for delivering traffic after a P2P communication connection is established between the wireless devices.

In FIG. 2, a traffic slot (210) may include a traffic management channel (201) and a traffic channel (203). The traffic management channel (201) may be used with respect to signals related to traffic data transmission (e.g., scheduling and interference management) within a traffic channel (203). At this point, the traffic management channel (201) may include a connection scheduling segment (202), a rate scheduling segment (204), and an acknowledgement response segment (208). A data transmission segment (205) may also be referred to as a traffic channel (203). The connection scheduling segment (2020), the rate scheduling segment (204), the data segment (205), and the acknowledgement (208) segment, which are shown in FIG. 2, include a traffic signal.

Hereinafter, for simplicity in the description of the present invention, in FIG. 2, a wireless device that is to transmit data (or traffic) will be referred to as a transmitting device, and a wireless device that is to receive data will be referred to as a receiving device.

The connection scheduling segment (202) may be used for indicating to the receiving device that the transmitting device is ready to transmit traffic data. The rate scheduling segment (204) allows the transmitting/receiving device to acquire transmission rate and/or power used for transmitting the traffic data. In a later process, the data transmission segment (205) will be used for transmitting traffic data required by the acquired transmission rate and/or rate.

Additionally, the acknowledgement segment (208) may be used by the receiving device, so as to indicate that the traffic data are either received or not received by the data transmission segment (205). For example, a time duration of a traffic slot is equal to approximately 2 milliseconds. A time sequence structure shown in FIG. 2 indicates one period (or cycle period) of the time slots. Before transmitting the traffic data from the traffic slot (210), a P2P communication may be established between the transmitting device and the receiving device through a control slot (214).

The control slot (214) may be occasionally inserted in-between traffic slots. The traffic slots (210) indicate time intervals at which P2P traffic data may be transmitted to the receiving device through a transmission channel. Each control slot (214) may include a CID broadcast channel (Connection Identifier Broadcast Channel, 216) and a Paging Channel (218).

The control slot (214) may be generated at intervals, which are longer than those of the traffic slots. For example, the control slot (214) may be generated once each second. The control slot (214) performs the function (or role) of establishing P2P connection between the transmitting device and the receiving devices and of maintaining the established P2P connection. The CID broadcast channel (216) may be used for indicating P2P connection identifiers (CIDs), which are being used by neighboring connections, and for indicating whether or not the corresponding P2P connection is still alive.

For example, the transmitting device and receiving devices may monitor the CID broadcast channel (216), so as to verify which CID is currently being used. The paging channel (218) may be used by the transmitting device and the receiving devices in order to configure new CIDs with respect to a new P2P connection, and the paging channel (218) may include a Paging Request Channel and a Paging Response Channel.

1.3 Connection (Link) Establishment Procedure of P2P Communication System

Figure 3:
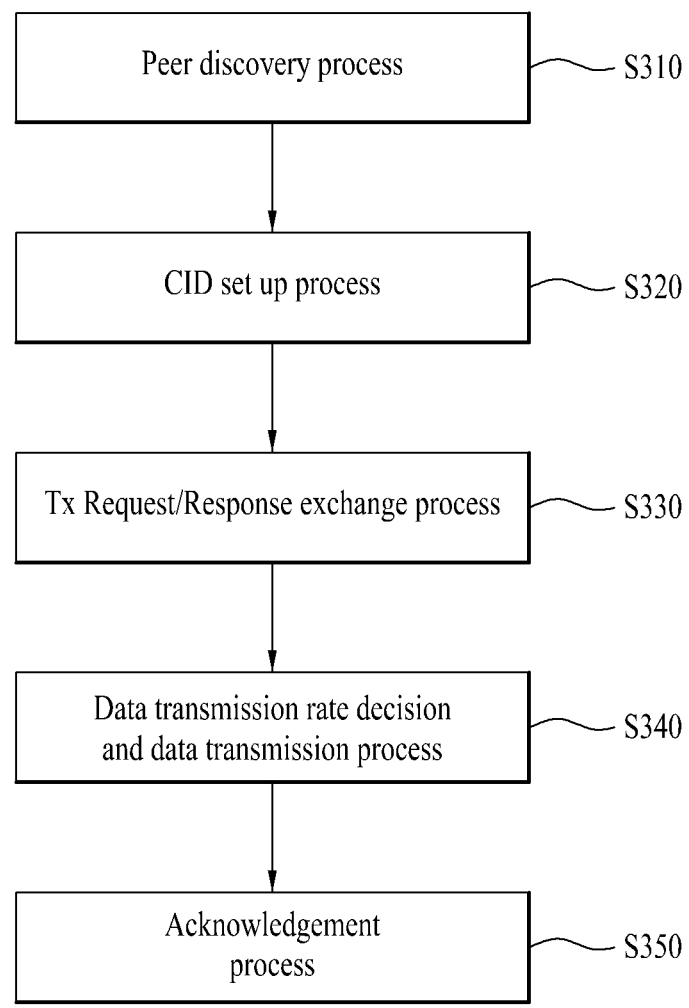
FIG. 3 illustrates an exemplary connection (link) establishment procedure used in the present invention.

FIG. 3 illustrates an exemplary connection (link) establishment procedure used in the present invention.

The connection establishment procedure consists of a peer discovery step (S310), a CID set-up process (S320), a transmission (Tx) request and transmission response exchange process (S330), a Data Rate decision and data transmission process (S340), and an Acknowledgement process (S350).

The peer discovery step (S310) refers to a process of having the peer devices each performing P2P communication to identify one another. Each peer device may maintain and update a device list respective to peer devices existing near the corresponding peer device. In order to do so, each of the peer devices may transceive (transceiver and receive) a specific beacon, which may be identified as a beacon respective to which specific peer device.

The CID set-up process (S320) corresponds to a process of setting up a connection between one peer device and a target peer device, which is intended to actually perform P2P connection. By performing the CID set-up process, the peer devices may set up CID between peers that ate to perform P2P communication.

The Tx request/response exchange process (S330) corresponds to a process of transceiving (transmitting and receiving) an Indication Signal for actually transceiving (transmitting and receiving) data traffic. By transceiving the request/response signals to and from one another, the peer devices may be capable of deciding whether a specific peer device should perform data transmission or whether the corresponding specific peer device should yield its data transmission for the data transmission of another peer device.

The data transmission rate decision and data transmission process (S340) corresponds to a process step of having a peer device decide a data rate of the data, which the peer device is intended to transmit, and having the peer device actually perform data transmission. In order to device the data transmission rate, the peer devices may transmit a specific Pilot Signal and may transmit and receive response signals respective to the transmitted pilot signal.

The acknowledgement process (S350) corresponds to a process of having each of the peer devices notify a transmitting peer device of an ACK/NACK respective to the data transmission.

1.4 Peer Discovery Process

Hereinafter, a peer discovery process, which enables discovery and identification to be performed between the peer devices, will be described in detail. The peer discovery process corresponds to a process of allowing two or more P2P wireless devices to detect and identify one another before traffic delivery of the P2P connection occurs.

The P2P system (100) may support the peer discovery process, by configuring a P2P network and by periodically providing short text messages to peers (devices). For example, in case the first device (102) corresponds to a transmitting device, the first device may periodically broadcast or transmit signals to other receiving devices, which correspond to the second device and the third device. The signals that are being periodically transmitted enable the second device (106) to identify the first device (102), when the second device (106) is located near the first device (102). After the second device (106) has identified the first device (102), an active P2P link (108) may be established between the first device and the second device.

The transmission of radio signals for peer discovery may be periodically performed during specified time periods, which are referred to as peer discovery intervals. Such transmission timing may be decided in advance by a protocol and may then be notified to the wireless devices. Additionally, the wireless devices may each transmit individual signals in order to identify one another. For example, the first device and/or the second device may transmit a signal during part of a peer discovery interval. Moreover, each of the wireless devices may monitor signals that are potentially transmitted by other wireless devices during the rest of the peer discovery interval.

For example, the radio signal may correspond to a beacon signal. At this point, the peer discovery interval may include a plurality of symbols (e.g., OFDM symbols). The first device (102) may select at least one symbol from the peer discovery interval. Additionally, the first device (102) may transmit a signal respective to a tone existing in the symbol, which is selected by the first device.

After the wireless devices have discovered one another through the peer discovery process, the wireless devices may proceed to the Connection establishment process. For example, in FIG. 1, the first device and the second device may be linked with one another through a connection process. Thereafter, the first device (102) may use the P2P link (108), so as to transmit traffic to the second device (106). And, the second device (106) may use the P2P link (108), so as to transmit traffic to the first device (102).

1.5 Channel Structure

Figure 4:
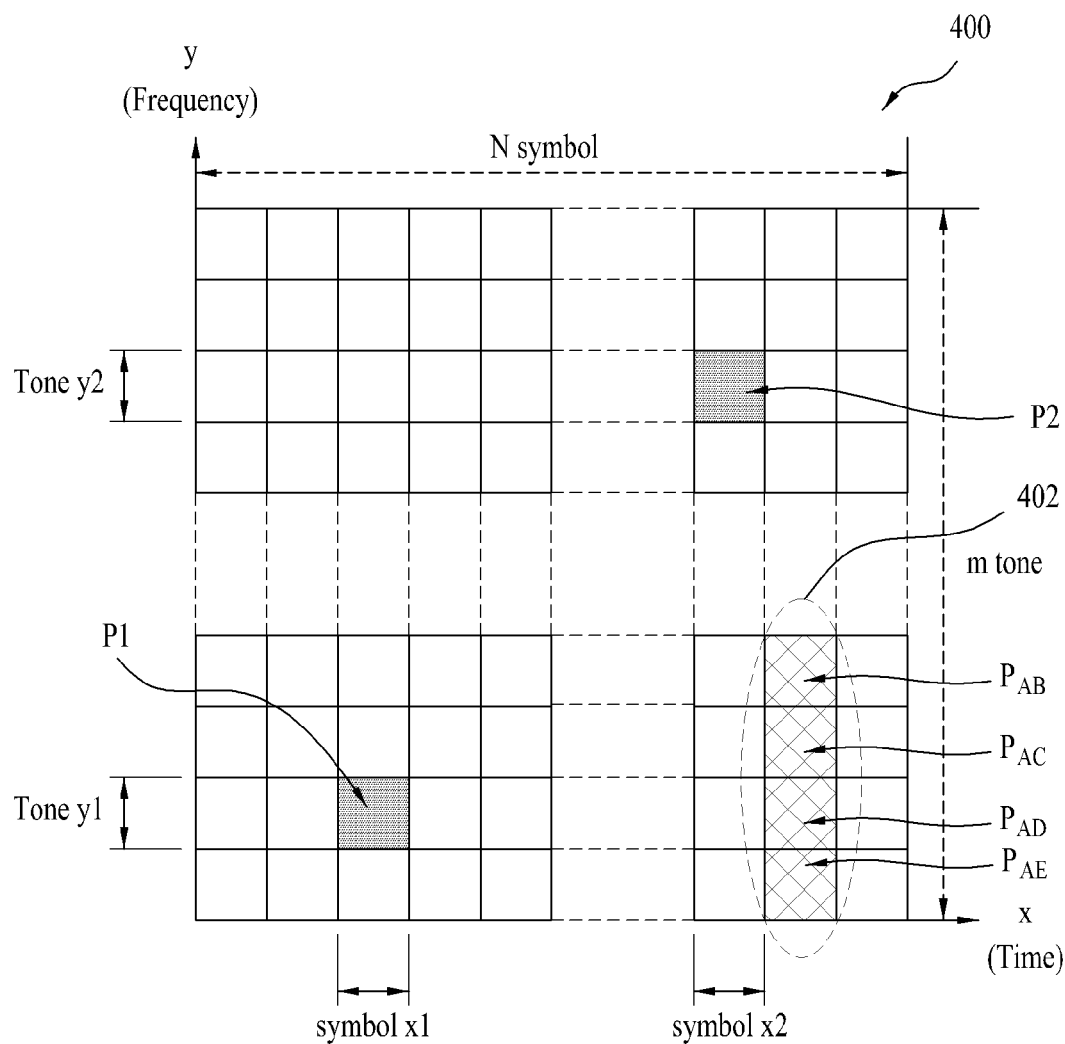
FIG. 4 illustrates an exemplary channel structure respective to a transmission of a time-frequency based radio signal.

FIG. 4 illustrates an exemplary channel structure respective to a transmission of a time-frequency based radio signal.

The signal that is used in FIG. 4 may correspond to an OFDM signal. A time-frequency structure (400) corresponds to resources that can be used for transmitting or receiving signals throughout a P2P network during a control slot (e.g., the control slot (214) of FIG. 2) and/or traffic channel slot (traffic slot (210) within a traffic management channel (201)). In FIG. 4, the x-axis may correspond to a time axis and may include N number of symbols (wherein N is an arbitrary integer), and the y-axis may correspond to a frequency axis and may include M number of tones (wherein M is an arbitrary integer).

The transmitting device and/or receiving device may use the time-frequency structure (400) in the traffic management channel. For example, the time-frequency structure (400) may be considered as a connection identifier (CID) resource area, which may select a CID resource unit respective to the CID of each peer device. For example, in a traffic slot, in order to signal a transmission request to a receiving device respective to a connection, which is related to its own CID, the transmitting device may select a CID resource unit. Additionally, in order to signal a request response to the transmitting device, the receiving device may select a CID resource unit.

The CID resource units that are available to the transmitting device and the receiving device may be differentiated in advance, so that, in the traffic management channel, the transmitting device can select a CID resource unit from a specific subset of the overall time-frequency structure, and so that the receiving device can select a CID resource unit from another specific subset. For example, a CID resource space of FIG. 4 may be used in the control slot (214) and/or a traffic slot (210) of FIG. 2. The CID resource unit may also be referred to as a "tile", and the CID resource unit may be defined by multiple tones along with a specific OFDM symbol.

The CID resource unit may be defined by a time-frequency combination or by a symbol-tone combination. A specific symbol (e.g., transmission time) may be used in the P2P network in order to identify current slot intervals in a traffic management channel of a traffic slot or in a control slot. In this case, a specific tone respective to the selected symbol may be decided. The specific tone may be decided based upon an identifier of the wireless device and/or a time variable. At this point, a hash function respective to the time variable or identifier of the wireless device may be used for calculating a position of a selected symbol and/or a position of a tone.

For example, when a time variable respective to a given connection is assigned with a first value, the wireless device may calculate a symbol x1 and a tone y1, so that the wireless device can use a hash function in order to transmit a single-tone signal (P1) from the CID resource unit shown in FIG. 4. Additionally, when a time variable respective is assigned with a second value, the wireless device may calculate a symbol x2 and a tone y2, so that the wireless device can use a hash function in order to transmit a single-tone signal (P2) as in the CID resource unit shown in FIG. 4.

With respect to a P2P connection between one wireless device and multiple wireless devices (e.g., one to many), as a subset of a CID resource unit, resource units (e.g., tiles (402)) may be used for identifying the corresponding P2P connection. At this point, the tiles (402) may be contiguously positioned or pseudo-randomly selected from between the CID resource unit (400).

In FIG. 4, a first P2P connection (connection between wireless devices A and B) may be identified by a resource unit PAB, and a second P2P connection (connection between wireless devices A and C) may be identified by a resource unit PAC, and a third P2P connection (connection between wireless devices A and D) may be identified by a resource unit PAD. Additionally, a fourth P2P connection (connection between wireless devices A and E) may be identified by a resource unit PAE.

The position of the selected tone-symbol (i.e., resource unit) shown in FIG. 4 may perform the role of indicating a priority level of the radio signal transmission respective to a traffic slot of a specific time. For example, after a peer device has recognized a transmission (or transport) request, its respective peer device may reciprocally transmit an echo or a request response from different pseudo-random positions respective to reception (Rx) symbols within the time-frequency structure.

Each of the transmitting devices and/or receiving devices may decide whether or not to transmit its own data (i.e., traffic) from a current time slot, based upon power measurement and position based priority level information acquired from transmission request and echo positions. For example, a position of a CID resource unit (400) corresponding to a left-side column and/or a lower line may be considered to have a lower priority level than positions corresponding to a right-side column and/or an upper line.

2. Data Transmission Method According to Priority Level Based Acknowledgement Signal In a P2P communication lacking centralized scheduling, data transmission is realized in accordance with a frame structure, which is based upon specific time slots. However, in a situation lacking a central controller (e.g., base station), which is intended to control re-transmission, the process of scheduling the re-transmission may not be easily performed.

In case a specific transmitting device arbitrarily performs re-transmission in accordance with a negative acknowledgement signal (NACK signal), which has been transmitted from a specific receiving device, this may affect (or influence) the data transmission of other peer devices. Most particularly, in case the corresponding re-transmission process causes influence on a P2P communication link having a higher priority level than that of the current P2P communication link, the problem may become more critical.

In order to resolve the above-described problem, data transception (transmission/reception) methods based upon priority levels, service quality, and/or interference levels will hereinafter be described in detail.

2.1 Method for Controlling Re-Transmission Based Upon Priority Levels

Peer devices may determine priority levels of a P2P communication link to which they belong based upon a resource area to and/or from which an ACK/NACK signal is being transmitted and/or received. A method for setting upon a resource area based upon the priority level will hereinafter be described in detail.

Figure 5:
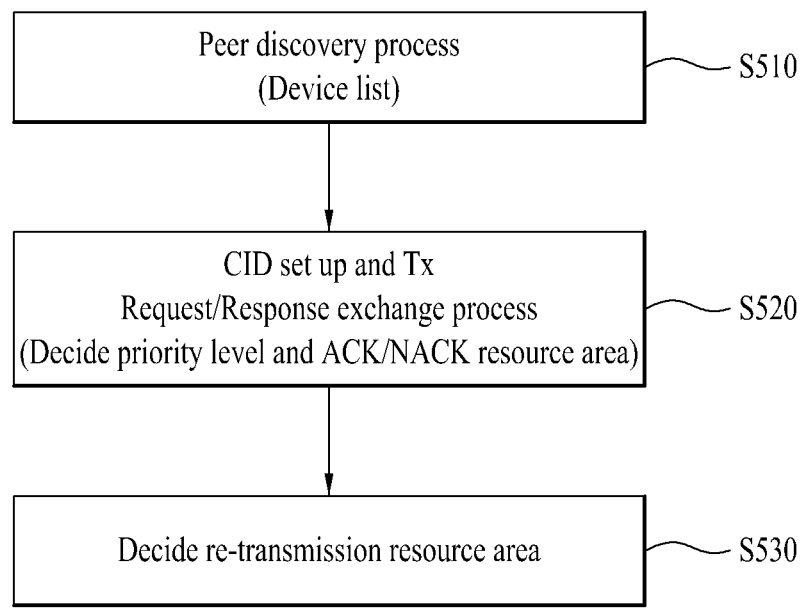
FIG. 5 illustrates one of method for setting up a priority level based (or priority-based) resource area in a peer-to-peer communication system according to an exemplary embodiment of the present invention.

FIG. 5 illustrates one of method for setting up a priority level based (or priority-based) resource area in a peer-to-peer communication system according to an exemplary embodiment of the present invention.

In a P2P communication link broadcasting ACK/NACK signals, by performing processes of the previous step (e.g., CID set-up process, Tx Request/Response signaling), the transmitting device may determine higher or lower priority levels (or QoS levels) of neighboring P2P communication links. Additionally, since the transmitting device is aware of a transmission time point of the P2P communication link and/or an area of a time-frequency resource unit, the transmitting device may be capable of controlling its own re-transmission.

In a situation requesting for re-transmission due to a failure in data decoding of a previous transmission (e.g., when receiving a NACK signal), and in case a communication link having a higher priority level than that of the current transmitting device does not exist near the corresponding transmitting device, after receiving the NACK signal, the current transmitting device may re-transmit its own data from a slot, which is intended to transmit the next data. Alternatively, if a communication link having a higher priority level (or QoS level) than that of the current transmitting device exists near the corresponding transmitting device, then, after receiving the NACK signal, the current transmitting device yields the re-transmission.

Referring to FIG. 5, one peer device (e.g., first device) may find neighboring peer devices through the peer discovery process and may, then, manage and update a device list respective to the neighboring peer devices. At this point, a resource area for performing ACK/NACK signal transmission may be variably determined (or set up) in accordance with the number of peer devices included in the device list and the number of neighboring link currently establishing connection (S510).

Additionally, through the CID set-up process, Tx Request and Response process, the first device may verify how many connection links are currently being established at which priority levels. Accordingly, the peer devices may set up resource area or resource tone sets for performing ACK/NACK transmission by using a function subordinate to such parameters (S520).

Therefore, in the P2P communication, the peer devices may verify the resource area in which the ACK/NACK signal is being received, thereby being capable of performing a comparison process, so as to determine whether the priority level of the corresponding link is higher or lower than its own priority level.

In case an NACK signal has been generated, the resource area re-transmitting the corresponding data may be pre-reserved based upon a maximum number of re-transmission sessions allowed by the system. Alternatively, the re-transmission resource area may be decided based upon a number of neighboring communication links and a priority level of each link (S530).

In step S530, a number of resource areas available for re-transmission of the P2P communication link having the highest priority level equivalent to the number of all communication links that are being monitored may be assigned. For example, if a number of communication links having priority levels lower than that of a specific peer device is equal to x, resource areas for performing x number of re-transmission sessions may be assigned.

In case the resource area being used for the transmission of the ACK/NACK signal is applied based upon priority levels, a value corresponding to the priority level that is decided in the CID set-up process (step S520) may be applied as the priority level. At this point, the most recently updated priority level may be applied as the priority. More specifically, although the priority level may be fixed for each communication link, in an environment where the priority level can be chronologically varied, the most recently updated priority level may be applied as the priority.

Figure 6:
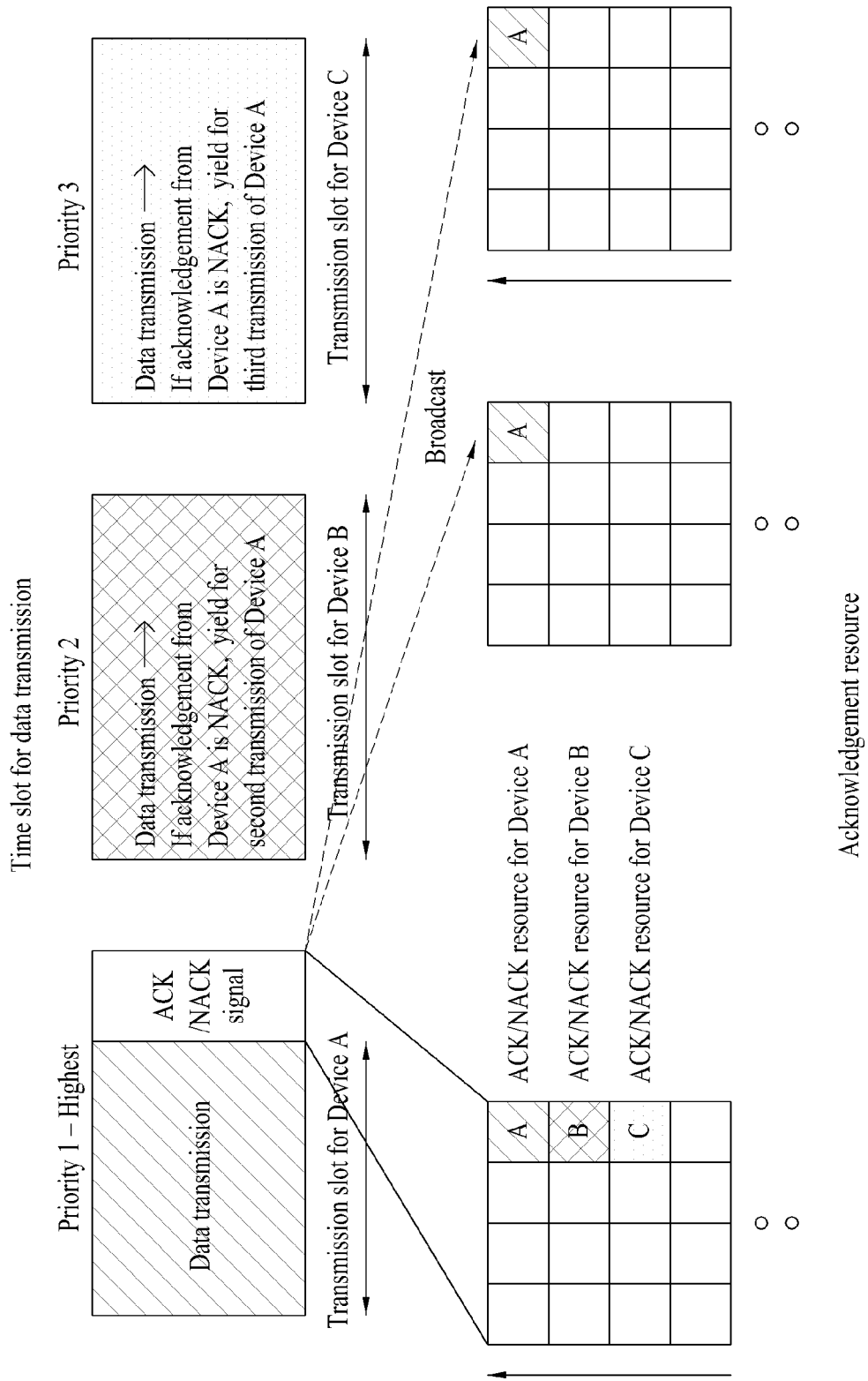
FIG. 6 illustrates one of method for setting up a priority level based (or priority-based) resource area in a peer-to-peer system according to an exemplary embodiment of the present invention.

FIG. 6 illustrates one of method for setting up a priority level based (or priority-based) resource area in a peer-to-peer system according to an exemplary embodiment of the present invention.

In FIG. 6, in case a receiving peer device of a specific P2P communication link has failed to receive data, instead of transmitting a negative acknowledgement (NACK) signal only to the transmitting peer device via unicast, the receiving peer device broadcasts the NACK signal, so that all peer devices can receive the corresponding signal.

At this point, in case the ACK/NACK signal is transmitted based upon the respective priority level (ref FIG. 5), the neighboring peer devices may refer to the priority levels respective to the transmission position of the ACK/NACK signal, so as to determine whether to have the other neighboring P2P communication links proceed with the data transmission as scheduled, or whether to yield its data transmission for the peer device of the P2P communication link having broadcasted the acknowledgement signal.

Therefore, in order to control the data transmission of the P2P communication link based upon the priority level (or QoS (Quality of Service) level), the peer devices of the P2P communication link may transmit ACK/NACK signals by using time-frequency resource units (ref FIG. 2 and FIG. 4), which are tied to (or connected to) the priority level (or QoS level) of the corresponding link.

Peer devices of other neighboring P2P communication links may verify priority levels respective to the position of a time-frequency resource unit, which is used by the corresponding ACK/NACK signal. Therefore, each of the neighboring peer devices may compare its own priority level with the priority level of the corresponding ACK/NACK signals, so as to decide whether or not to transmit its own data.

For example, in case an NACK signal having a higher priority level (or QoS level) than that its own link is transmitted, each of the neighboring peer devices may yield its data transmission, so that the transmitting peer device, which has broadcasted the ACK/NACK signal to the initial position of the data transmission, can perform-transmission. However, in case an ACK signal having a higher priority level (or QoS level) than that its own link is transmitted, each of the neighboring peer devices may directly perform its decided data transmission without any modification.

More specifically, in the neighboring P2P communication link, in case the position of the time-frequency resource unit of the broadcasted ACK/NACK signal corresponds to a time-frequency resource unit respective to a priority level (or QoS level) lower than that of its own P2P communication link, the transmitting peer device may directly transmit its own data regardless of the ACK/NACK signal without any modification.

The above-described process will hereinafter be described in more detail with reference to FIG. 6. In FIG. 6, three peer devices are included in a P2P network, and it will be assumed that each of device A, device B, and device C configures a different P2P communication link.

In a transmission slot for device A, which corresponds to a transmitting peer device, device A transmits data at the highest priority level. At this point, the receiving devices, which are counterparts of device, broadcast acknowledgement (ACK/NACK) signals respective to the data transmission of device.

At this point, since device A has the highest priority level, in the CID resource unit area, the ACK/NACK resource area respective to device A is located at an uppermost right side tone. Additionally, since device B has the next highest priority level, the ACK/NACK resource area respective to device B is located at the next tone, and, since device C has the lowest priority level, the ACK/NACK resource area respective to device C is located at a tone following (or next to) the ACK/NACK resource area respective to device B.

With respect to the data transmission of device A, the receiving peer device broadcasts an ACK/NACK signal through the ACK/NACK resource area for device A to all peer devices. At this point, device B and device C receive the broadcasted ACK/NACK signal through the ACK/NACK resource area respective to device A, which has the highest priority level, and, then, device B and device C may determine the priority level based upon the received position of the ACK/NACK signal.

Accordingly, in the transmission slot that is intended to transmit its own data, device B yields its data transmission for the re-transmission of device A. In case a NACK is also generated with respect to the re-transmitted data of device A, in the transmission slot that is intended to transmit its own data, device C also yields its data transmission for the third re-transmission of device A.

2.2 Method for Controlling Re-Transmission Based Upon Priority Level and Interference Level A method for controlling re-transmission based upon a priority level of the ACK/NACK signal as well as an interference level of transmission data in a P2P communication network will hereinafter be described in detail.

Figure 7:
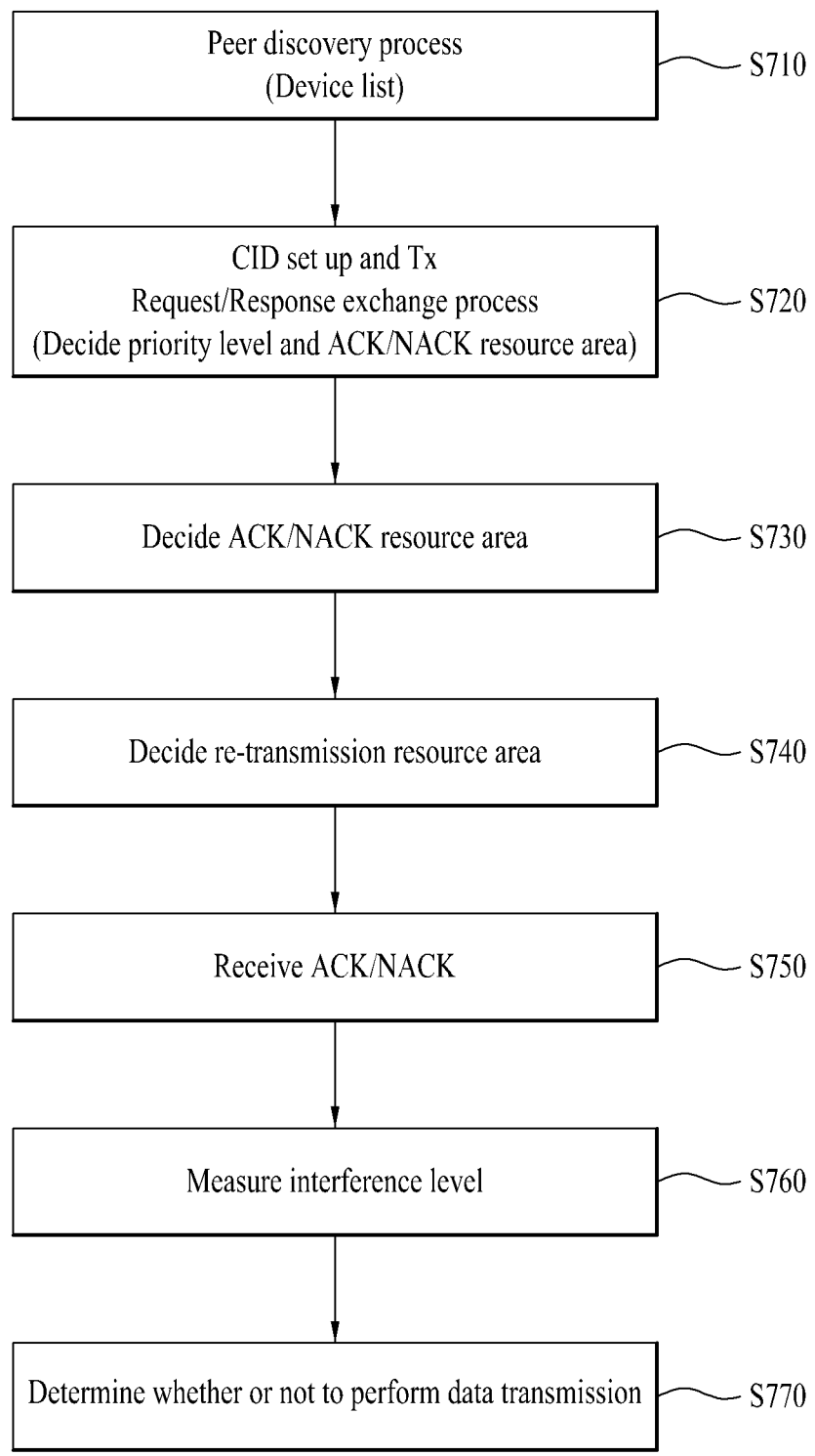
FIG. 7 illustrates another one of method for setting up a priority level based (or priority-based) resource area in a peer-to-peer communication system according to an exemplary embodiment of the present invention.

FIG. 7 illustrates another one of method for setting up a priority level based (or priority-based) resource area in a peer-to-peer communication system according to an exemplary embodiment of the present invention.

Referring to FIG. 7, one peer device (e.g., first device) may find neighboring peer devices through the peer discovery process and may, then, manage and update a device list respective to the neighboring peer devices. At this point, a resource area for performing ACK/NACK signal transmission may be variably determined (or set up) in accordance with the number of peer devices included in the device list and the number of neighboring link currently establishing connection (S710).

Additionally, through the CID set-up process, Tx Request and Response process, the first device may verify how many connection links are currently being established at which priority levels. Accordingly, the peer devices may set up a resource area for performing data transmission and a resource area or resource tone sets for performing ACK/NACK transmission by using a function subordinate to such parameters. This may be pre-reserved by using identifier information (e.g., RNTI) of peer devices that may be known during the peer discovery process (S720, S730).

Therefore, in the P2P communication, the peer devices may verify the resource area in which the ACK/NACK signal is being received, thereby being capable of performing a comparison process, so as to determine whether the priority level of the corresponding link is higher or lower than its own priority level.

In case an NACK signal has been generated, the resource area re-transmitting the corresponding data may be pre-reserved based upon a maximum number of re-transmission sessions allowed by the system. Alternatively, the re-transmission resource area may be decided based upon a number of neighboring communication links and a priority level of each link (S740).

In step S740, a number of resource areas available for re-transmission of the P2P communication link having the highest priority level equivalent to the number of all communication links that are being monitored may be assigned. For example, if a number of communication links having priority levels lower than that of a specific peer device is equal to y, resource areas for performing y number of re-transmission sessions may be assigned.

In case the resource area being used for the transmission of the ACK/NACK signal is applied based upon priority levels, a value corresponding to the priority level that is decided in the CID set-up process (step S720) may be applied as the priority level. At this point, the most recently updated priority level may be applied as the priority. More specifically, although the priority level may be fixed for each communication link, in an environment where the priority level can be chronologically varied, the most recently updated priority level may be applied as the priority.

The ACK/NACK signal is received through the ACK/NACK resource area, which is decided in step S730 (S750).

In step S750, if a NACK signal is received, and, in case the position of a time-frequency resource area (ACK/NACK resource area), to which the broadcasted NACK signal is transmitted, has a priority level (or QoS level) higher than the links of the peer devices belonging to other P2P communication links, the corresponding peer devices may yield their own data transmission, so that the P2P communication link having broadcasted the ACK/NACK signal can perform re-transmission to an initial position of the yielded data transmission.

At this point, the peer devices may decide whether or not to transmit data based upon the priority level of the NACK signal as well as an interference (or channel status) level of the tone to which the NACK signal is transmitted. Therefore, the peer devices may measure the interference level of the tone to which the NACK signal is transmitted (S760).

According to another exemplary embodiment of the present invention, in step S760, the peer devices may measure in advance an interference level value through signaling (e.g., CID broadcasting, Tx request/response signaling), and so on, which was previously transmitted and received to and from other peer devices Based upon the transmission position of the ACK/NACK signal and the measured interference level, each of the peer devices may be capable of determining whether or not to perform transmission on its own data (S770).

For example, comparison may be made with a specific threshold value having an interference level pre-reserved therein. Then, if the compared result does not exceed the threshold value, even though the corresponding peer device has received a broadcasted NACK signal through a resource area having a higher priority level than the corresponding peer device, the corresponding peer device may directly perform its own data transmission without yielding its data transmission.

However, in this case, in order to reduce the influence caused by the P2P communication link, the data may be transmitted by reducing the transmission rate of the data. Such control of the transmission rate may be variably adjusted in accordance with the interference (or channel state) measurement value. Alternatively, the peer devices may perform transmission by using only some tones of a tone set (tone subset) of the initial transmission.

Although the ACK signal has a higher priority level than the link of the corresponding peer device, in case the ACK signal is transmitted, the corresponding peer device may perform transmission of its own data.

In case of the transmitting devices of other P2P communication links, if the position of the time-frequency resource where the broadcasted ACK/NACK signal is used has a priority level (or QoS level) lower than that of the link of the respective transmitting device, the corresponding transmitting device performs its own data transmission regardless of whether or not the ACK/NACK signal has been received.

For example, in case the second device, which attempts to perform re-transmission does not have the highest priority level, in order to avoid influencing the transmission of peer devices (e.g., the first device or the third device) having higher priority levels than the second device, the second device monitors in advance the Tx request/response exchange process of other peer devices before attempting perform re-transmission. Accordingly, by being informed of the fact that a peer device having a higher priority level than the second device itself is preparing to transmit and receive transmission, the second device may determine whether or not the second device should perform re-transmission.

In the exemplary embodiments of the present invention, in case the priority level of the P2P communication link, to which the receiving peer device broadcasting the ACK/NACK signal belongs, has an extremely high priority level, or in case the corresponding P2P communication link performs numerous re-transmission sessions, the receiving peer device may especially increase the transmission power respective to the ACK/NACK signal and transmit the ACK/NACK signal. Most particularly, this application effect may be more effective when performing feedback of a NACK signal.

For example, even when transmitting devices of other neighboring communication links have failed to perform decoding of the broadcasted ACK/NACK signal, in case the respective receiving power is measured, and, in case the measured receiving power exceeds a specific threshold value, the corresponding signals is determined as a NACK. Thus, the transmitting devices may yield data transmission.

In the above-described exemplary embodiments of the present invention, the threshold value may be indicated in accordance with a system environment by a specific master/control tower or main device. Alternatively, based upon diverse channel environment values, which are measured when the peer devices establish communication link, the peer devices may set up threshold values on their own within the corresponding P2P communication link and apply the set up threshold values.

In the above-described exemplary embodiments of the present invention, the interference level may be decided based upon CIR (Carrier to Interference Ratio), CINR (Carrier to Interference Ratio), SIR (Signal to Interference Ratio), SINR (Signal to Interference plus Noise Ratio), and so on.

2.3 Method for Controlling IR (Incremental Redundancy) Re-Transmission

In the above-described exemplary embodiments of the present invention, when a NACK signal is fed-back as the acknowledgement response signal, the transmitting peer device may perform data re-transmission respective to the previous data by using an IR method, which corresponds to one of HARQ methods. For example, when receiving the NACK signal, the transmitting peer device may re-transmit only additional parity bits respective to the initially transmitted data.

At this point, in order to minimize any influence caused on other P2P communication links, the additional parity bits may be transmitted at an extremely low code rate and an extremely low power level. The power level and the code rate may be decided based upon the priority level of the transmitting peer device and the interference level influencing neighboring peer devices or the interference level influencing the corresponding transmitting peer device.

In case the decided power level and code rate does not exceed a specific threshold value, which is decided by the P2P network system, the corresponding re-transmission may be yielded. In order to do so, a module and function configured to calculate the power level and the code rate until a target requirement is satisfied may be applied.

In case a NACK is generated, and if next data traffic that is intended to be transmitted by the transmitting peer device of the corresponding P2P communication link exists, the transmitting peer device may not perform re-transmission respective to the conventional transmission. At this point, when transmitting the next data traffic, the transmitting peer device may multiplex additional parity bits with the next data by using the IR method and may then transmit the multiplexed data.

2.4 Method for Verifying ACK/NACK Signal in Power Saving Mode

During a section when a specific P2P communication link transmits and receives data, peer devices of other P2P communication links may be operated in a power saving mode, such as an Idle Mode or a Sleep Mode, in order to perform power saving.

At this point, apart from the peer devices of the P2P communication link, which is being operated in the power saving mode due to the absence of data that are to be transmitted, during a section where a specific P2P communication link re-transmits data, peer devices that have yielded their own data transmission due to having low priority levels (e.g., second devices) or peer devices that are to perform data transmission after waking up from the power saving mode (e.g., third devices) should be awake in advance in accordance with a time point when the acknowledgement signal is being transmitted in order to be capable of receiving the acknowledgement signal, which is broadcasted by the corresponding specific P2P communication link.

In this case, instead of waking up at the exact point of a connection scheduling segment of a next transmission/traffic slot (transmission slot that is to be transmitted in the corresponding specific P2P communication link) (e.g., connection scheduling segment), the second devices and the third devices may be awake in advance at a time point corresponding to an ACK/NACK segment (ref FIG. 2), so as to receive the broadcasted ACK/NACK signal.

2.5 Method of Adjusting Priority Level for Re-Transmission

In the exemplary embodiments of the present invention, in a P2P communication link, when a receiving peer device has failed to perform data decoding, and when the receiving peer device broadcasts a NACK signal as a result, a transmitting peer device may arbitrarily increase the conventional priority level of the corresponding device, so as to perform a next connection scheduling process step. This method may be usefully applied, most particularly, when the NACK signal is contiguously broadcasted.

For example, when the transmitting peer device has failed to perform the previous transmission, during a next traffic slot section, the corresponding transmitting peer device may decide whether or not to perform priority-based data transmission with other P2P communication links through a Tx request/response process. At this point, the transmitting peer device may increase its priority level to a specific level, so as to perform transmission.

3. P2P Device

In the exemplary embodiments of the present invention, communication between P2P devices refers to a communication format, which is performed between devices passing through (or being connected with) the base station, or which is performed between a base station and devices without any human involvement, or refers to a communication format, which is performed between P2P devices. Therefore, a P2P Device refers to a user equipment (or device) that may be provided with support for performing communication with the above-described P2P devices.

An access service network for P2P services may be defined as a P2P ASN (P2P Access Service Network), and a network entity communicating with the P2P devices may be referred to as a P2P server. Herein, the P2P server executes a P2P application and provides a P2P specific service for one or more P2P devices. A P2P feature corresponds to a characteristic (or feature) of a P2P application. And, herein, at least one or more features (or characteristics) are required for providing an application. A P2P device group refers to a group of P2P devices sharing at least one or more common characteristics (or features).

Within a consistent network, a number of devices communicating via P2P communication (i.e., such devices may be diversely referred to as P2P devices, P2P communication devices, and so on) may gradually increase in accordance with an increase in the respective Machine Application Type.

Herein, the Machine Application Types may include (1) security, (2) public safety, (3) tracking and tracing, (4) payment, (5) healthcare, (6) remote maintenance and control, (7) metering, (8) consumer device, (9) Fleet Management in an application market related to POS (Point of Sales) and security, (10) communication between devices in Vending Machines, (11) remote monitoring of machines and equipments, (12) Surveillance Video communication of surveillance cameras, and so on. However, the Machine Application types are not required to be limited only to the above-mentioned types. And, therefore, other variety of machine application types may also be applied herein.

Figure 8:
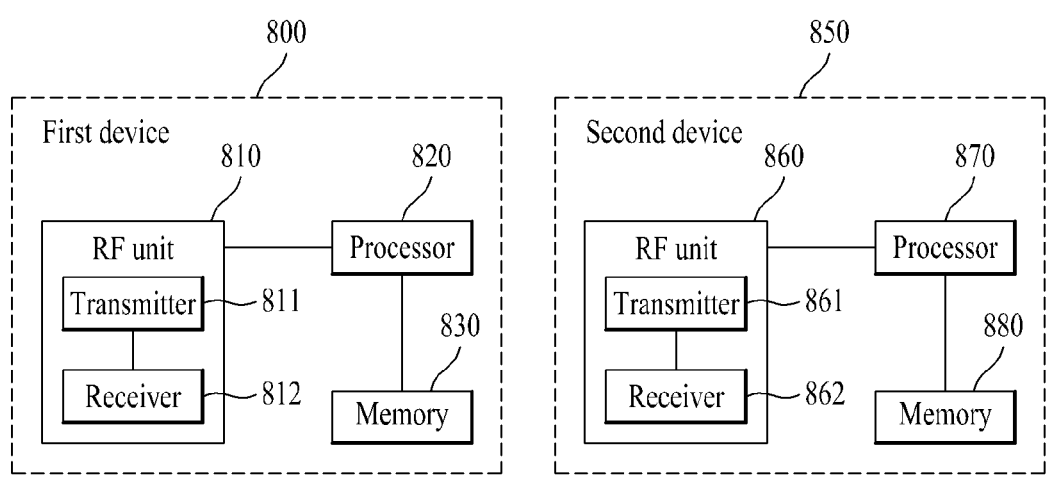
FIG. 8 illustrates a general view showing device configuration of peer devices that can adopt the exemplary embodiments described above with reference to FIG. 1 to FIG. 7 according to an exemplary embodiment of the present invention.

FIG. 8 illustrates a general view showing device configuration of peer devices that can adopt the exemplary embodiments described above with reference to FIG. 1 to FIG. 7 according to an exemplary embodiment of the present invention.

Referring to FIG. 8, as peer devices, a first device (800) and a second device (850) may each include a radio frequency unit (RF unit) (810, 860), a processor (820, 870), and may selectively (or optionally) include a memory (830, 880). Although FIG. 8 illustrates a structure of two P2P devices, a P2P communication environment between multiple P2P devices may also be established.

Each RF unit (810, 860) may respectively include a transmitter (811, 861), and a receiver (812, 862). The transmitter (811) and the receiver (812) of the P2P device (800) may be configured to transmit and receive signals to and from the base station (850) and other P2P devices. And, the processor (820) may be functionally connected to the transmitter (811) and the receiver (812), so as to be capable of controlling the process performed by the transmitter (811) and the receiver (812) for transmitting and receiving signals to and from other devices. Additionally, the processor (820) may first perform diverse processes on the signal that is to be transmitted and, then, transmit the processed signal to the transmitter (811), and the processor (820) may also perform processes on the signal that is received by the receiver (812).

When required, the processor (820) may store information included in an exchanged message in the memory (830). And, by being configured to have the above-described structure, the P2P device (800) may perform the method according to diverse exemplary embodiments of the present invention, which are described above in detail.

Meanwhile, although it is not shown in FIG. 8, the P2P device (800) may include diverse additional configurations depending upon the respective device application type. For example, when the corresponding P2P device (800) is designated to perform smart metering, the corresponding P2P device (800) may include an additional configuration for performing power measurement. And, such power measuring operation may be controlled by the processor (820) shown in FIG. 8, and such power measuring operation may also be controlled by a separately configured processor (not shown).

Although FIG. 8 shows a case when communication is performed between one or more P2P devices, the P2P communication method may also be performed between the P2P device (800) and the base station. At this point, each device may perform the method according to diverse exemplary embodiments of the present invention, which will hereinafter be described in detail, in the base format as each device structure, which is shown in FIG. 8.

For example, the second device (850) may correspond to the base station. At this point, the transmitter (861) and the receiver (862) of the base station may be configured to transmit and receive signals to and from another base station, P2P server, and P2P devices. And, the processor (870) may be functionally connected to the transmitter (861) and the receiver (862), so as to be capable of controlling the process performed by the transmitter (861) and the receiver (862) for transmitting and receiving signals to and from other devices. Additionally, the processor (870) may first perform diverse processes on the signal that is to be transmitted and, then, transmit the processed signal to the transmitter, and the processor (870) may also perform processes on the signal that is received by the receiver (862). When required, the processor (870) may store information included in an exchanged message in the memory (830). And, by being configured of the above-described structure, the base station (850) may perform the method according to diverse exemplary embodiments of the present invention, which are described above in detail.

Referring to FIG. 8, in each of the first device (810) and the second device (850), the processor (820, 870) may direct the operations (e.g., control, adjustment, management, and so on) of each of the first device (810) and the second device (850). Each of the processors (820, 870) may be connected to the respective memory (830, 880) storing program codes and data. Each memory (830, 880) may be connected to the respective processor (820, 870), so as to store operating systems, applications, and general files.

The processor (820, 870) of the present invention may also be referred to as a controller, a microcontroller, a microprocessor, a microcomputer, and so on. Meanwhile, the processor (820, 870) may be implemented in the form of hardware or firmware, or software, or in a combination of hardware or firmware, and software. In case of implementing the embodiments of the present invention in the form of hardware, the processor (820, 870) may be equipped with ASICs (application specific integrated circuits) or DSPs (digital signal processors), DSPDs (digital signal processing devices), PLDs (programmable logic devices), FPGAs (field programmable gate arrays), and so on, which are configured to perform the present invention.

Meanwhile, in case of implementing the embodiments of the present invention in the form of firmware or software, the firmware or software may be configured to include a module, procedure, or function, which performs the above-described functions or operations of the present invention. And, the firmware or software, which is configured to perform the present invention may be provided in the processor (820, 870) or may be stored in the memory (830, 880), so as to be operated by the processor (820, 870).

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described embodiments of the present invention may be applied to a wide range of wireless access systems. Examples of the diverse wireless access systems may include 3GPP (3rd Generation Partnership Project) systems, 3GPP2 systems, and/or IEEE 802.xx (Institute of Electrical and Electronic Engineers 802) systems, and so on. In addition to the diverse wireless access systems, the exemplary embodiments of the present invention may also be applied to all technical fields applying and adopting the diverse wireless access systems.

What is claimed is:

1. A method for transmitting data from a first device in a Peer to Peer (P2P) communication system, the method comprising:
    waking up from a power saving mode, at a time point of an acknowledgement/negative acknowledgement (ACK/NACK) signal transmission in a first traffic slot, to transmit data in a second traffic slot which is a next traffic slot of the first traffic slot;
    receiving, from a receiving device, a broadcasted negative acknowledgement (NACK) signal in the first traffic slot, wherein the broadcasted NACK signal is for a data transmission from a second device to the receiving device;
    comparing priority levels between a P2P communication link of the second device and a P2P communication link of the first device, based upon a resource unit to which the NACK signal is broadcasted; and
    determining whether to transmit the data in the second traffic slot or to yield data transmission based upon the priority levels,
    wherein a resource area including a plurality of resource units for NACK signals is defined by one Orthogonal Frequency Division Multiplexing (OFDM) symbol and a plurality of successive tones, and
    wherein each of the plurality of resource units is allocated to each of a plurality of peer devices including the first device and the second device, in an order of priority levels of the peer devices.

2. The method of claim 1, further comprising:
    updating a device list respective to the peer devices through a peer discovery process in the first device;
    deciding priority level of links between the peer devices through a connection identifier set up process and a transmission request/response process; and
    allocating the each of the plurality of resource units for the NACK signals in accordance with the decided priority level.

3. The method of claim 2, further comprising:
    deciding a re-transmission resource area for re-transmitting data of each of the peer devices based upon the decided priority level,
    wherein a number of the re-transmission resource area and a maximum number of repeating the re-transmitting data are same as a number of links having priority levels lower than a priority level of each of the peer devices.

4. The method of claim 2, further comprising:
    yielding transmission of the data and entering an idle mode when the priority level of the P2P communication link of the second device is higher than the priority level of the P2P communication link of the first device.

5. The method of claim 2, further comprising:
    transmitting the data, when the priority level of the P2P communication link of the second device is lower than the priority level of the P2P communication link of the first device.

6. The method of claim 2, further comprising:
    measuring an interference level respective to the NACK signal, and
    even if the priority level of the P2P communication link of the second device is higher than the priority level of the P2P communication link of the first device, if the interference level is lower than a predetermined threshold value, transmitting the data.

7. The method of claim 2, further comprising:
measuring an interference level during at least any one of the connection identifier set up process and the transmission request/response process,
even if the priority level of the P2P communication link of the second device is higher than the priority level of the P2P communication link of the first device, if the interference level is lower than a predetermined threshold value, transmitting the data.

8. A first device for transmitting data in a Peer to Peer (P2P) communication system, the first device comprising:
a transmitter;
a receiver; and
a processor operatively connected to the transmitter and the receiver,
wherein the processor is configured to:
control the first device to wake up from a power saving mode, at a time point of an acknowledgement/negative acknowledgement (ACK/NACK) signal transmission in a first traffic slot, to transmit data in a second traffic slot which is a next traffic slot of the first traffic slot;
receive, from a receiving device, a broadcasted negative acknowledgement (NACK) signal in the first traffic slot,
wherein the broadcasted NACK signal is for a data transmission from a second device to the receiving device,
compare priority levels between a P2P communication link of the second device and a P2P communication link of the first device, based upon a resource unit to which the NACK signal is broadcasted; and
determine whether to transmit the data in the second traffic slot or whether to yield data transmission based upon the priority levels,
wherein a resource area including a plurality of resource units for NACK signals is defined by one Orthogonal Frequency Division Multiplexing (OFDM) symbol and a plurality of successive tones, and
wherein each of the plurality of resource units is allocated to each of a plurality of peer devices including the first device and the second device, in an order of priority levels of the peer devices.

9. The first device of claim 8, wherein the processor is configured to:
update a device list respective to the peer devices through a peer discovery process in the first device;
decide priority level of links between the peer devices through a connection identifier set up process and a transmission request/response process; and
allocate the each of the plurality of resource units for the NACK signals in accordance with the decided priority level.

10. The first device of claim 9,
wherein the processor is configured to decide a re-transmission resource area for re-transmitting data of each of the peer devices based upon the decided priority level, and
wherein a number of the re-transmission resource area and a maximum number of repeating the re-transmitting data are same as a number of links having priority levels lower than a priority level of each of the peer devices.

11. The first device of claim 9, wherein the processor is configured to yield transmission of the data and enter an idle mode, when the priority level of the P2P communication link of the second device is higher than the priority level of the P2P communication link of the first device.

12. The first device of claim 9, wherein the processor is configured to transmit the data, when the priority level of the P2P communication link of the second device is lower than the priority level of the P2P communication link of the first device.

13. The first device of claim 9, wherein the processor is configured to:
measure an interference level respective to the NACK signal, and
even if the priority level of the P2P communication link of the second device is higher than the priority level of the P2P communication link of the first device, if the interference level is lower than a predetermined threshold value, transmit the data.

14. The first device of claim 9, wherein the processor is configured to:
measure an interference level during at least any one of the connection identifier set up process and the transmission request/response process, and
even if the priority level of the P2P communication link of the second device is higher than the priority level of the P2P communication link of the first device, if the interference level is lower than a predetermined threshold value, transmit the data.

* * * * *